United States Patent
Wang et al.

(10) Patent No.: US 8,621,195 B2
(45) Date of Patent: Dec. 31, 2013

(54) DISABLING COMMUNICATION PORTS

(75) Inventors: Chin-Yu Wang, Taipei (TW); Jen-Chun Hsu, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 345 days.

(21) Appl. No.: 13/094,969

(22) Filed: Apr. 27, 2011

(65) Prior Publication Data
US 2012/0278598 A1 Nov. 1, 2012

(51) Int. Cl.
*G06F 9/00* (2006.01)
(52) U.S. Cl.
USPC .................................................. 713/2; 710/10
(58) Field of Classification Search
USPC .................................................. 713/2; 710/10
See application file for complete search history.

(56) References Cited

U.S. PATENT DOCUMENTS

| | | |
|---|---|---|
| 6,032,256 A | 2/2000 | Bernard |
| 6,138,240 A | 10/2000 | Tran et al. |
| 7,725,731 B2 | 5/2010 | Brown et al. |
| 7,779,266 B2 | 8/2010 | Su |
| 7,898,397 B2 | 3/2011 | Kerr et al. |
| 2008/0244108 A1* | 10/2008 | Abramson et al. ............ 710/16 |
| 2008/0270780 A1 | 10/2008 | Lopez et al. |
| 2010/0083366 A1 | 4/2010 | Challener et al. |

* cited by examiner

*Primary Examiner* — Albert Wang
(74) *Attorney, Agent, or Firm* — Milin Nalin Patel

(57) ABSTRACT

Example embodiments disclosed herein relate to enabling or disabling a port by writing to a reset write-once register. A boot process for a device is initiated. The reset write-once register is set, during the boot process, to disable or enable the port.

15 Claims, 5 Drawing Sheets

DISABLING COMMUNICATION PORTS

BACKGROUND

Service providers and manufacturers are challenged to deliver quality and value to consumers, for example by providing useful tools and features in products. Many consumers wish to control features made available to users. For example, a corporate or government entity may wish to disable communication abilities of a computer that the entity purchases for security reasons.

BRIEF DESCRIPTION OF THE DRAWINGS

The following detailed description references the drawings, wherein.

DETAILED DESCRIPTION

As noted above, many users (e.g., corporate and government entities) may wish to disable communication abilities of a computing device that the consumer purchases or leases from a manufacturer or service provider. Such commercial customers of computers and workstations may need or wish to disable or remove some or all of their external communication ports (e.g., universal serial bus (USB), serial ports, parallel ports, etc.). Benefits to this approach include avoiding the introduction of viruses through a USB flash drive, preventing intellectual property from leaking out of the environment, or the like. For example, an employee of a company may unwittingly attempt to use an infected storage device via the port. The attempted use may cause the computing device and/or attached network devices to become infected.

Some USB controllers provide an option to disable some ports; however, these approaches may not be secure. For example, someone with knowledge of the platform may be able to circumvent the protection or use a brute-force search to re-enable the ports. Further, USB controllers may include other limitations, for example, the controller architecture may require some ports to be disabled before others. This can be difficult for an end user to understand and/or implement. Moreover, the same techniques to disable one USB port associated with a first USB controller may not work with another USB controller. As such, these options are not universal and a manufacturer of computing devices may be required to implement different techniques to deal with different USB controllers.

To address these challenges, various embodiments herein relate to disabling one or more ports securely. In certain embodiments, a port is an interface between a computing device and other computing devices and/or peripheral devices. Ports may be disabled using a reset write-once mechanism. In certain embodiments, a reset write-once mechanism is a mechanism where once information is written to a register, the register does not change state until the entire computing system is reset. In the example of a binary register, a 1 or a 0 can be written and not change from that state unless the computing system is reset. In certain embodiments, the computing system requires a hard reboot for the register to allow for a change. The register can be utilized to drive a General Purpose Input/Output (GPIO) signal of a chip. The output can drive one or more circuits connected to one or more data lines of a particular port. The circuit, when the register calls for the port to be disabled, can cause the one or more data lines to be driven to a particular state (e.g., 1 or a 0). The port is rendered disabled because the data lines cannot change state.

Figure 1:
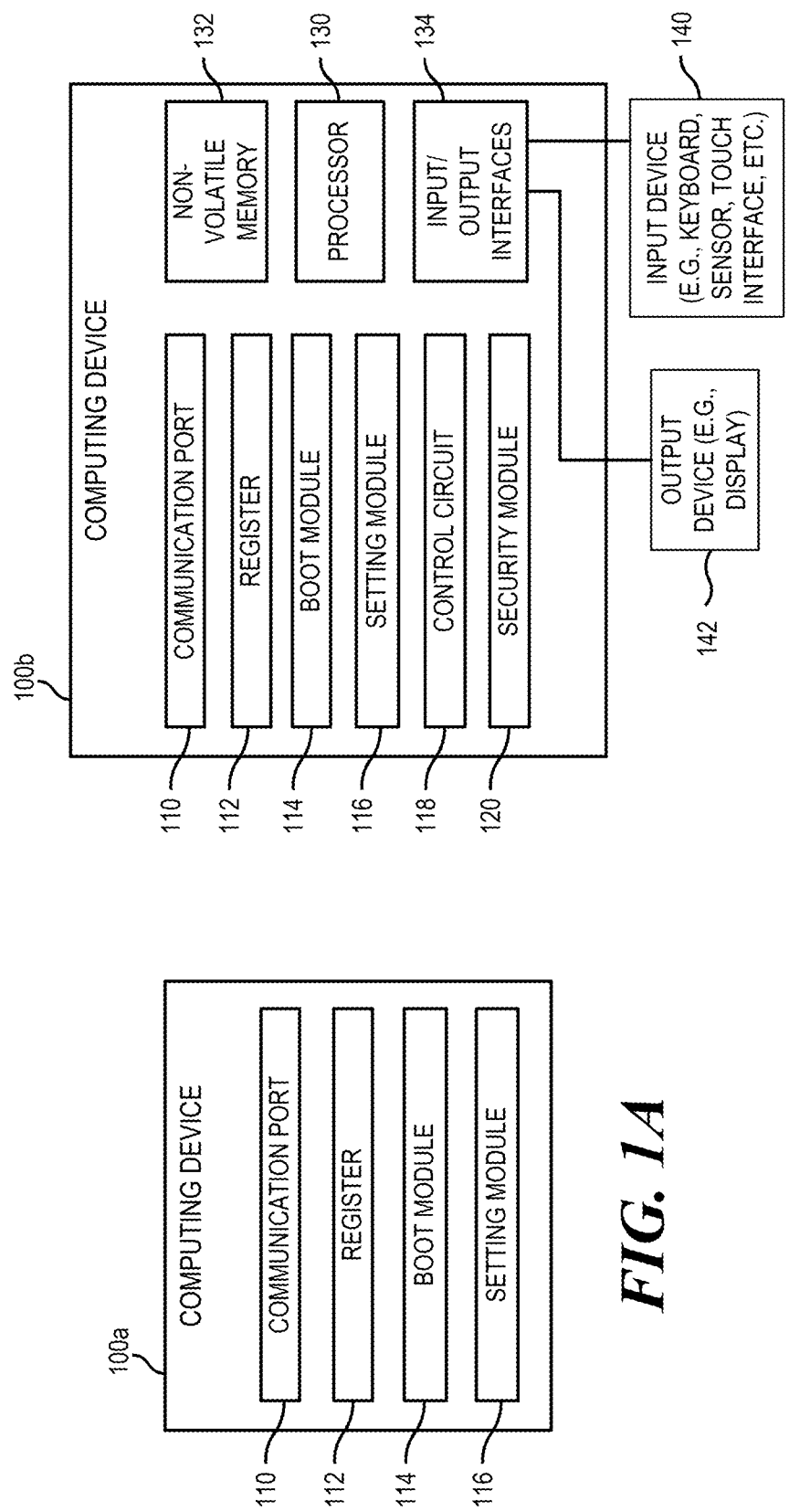
FIGS. 1A and 1B are block diagrams of computing devices capable of disabling communication ports, according to various examples.

Referring now to the drawings, FIGS. 1A and 1B are block diagrams of computing devices capable of disabling communication ports, according to various examples. Computing devices 100a, 100b include components that can be utilized to enable or disable one or more communication ports. The respective computing devices 100a, 100b may be a notebook computer, a desktop computer, a tablet computing device, a wireless device, a server, a workstation, or any other computing device that may have communication ports. The devices include at least one communication port 110 that, if enabled, can be utilized to communicate with external sources. The computing devices 100a, 100b also include a register 112 to enable or disable the communication port 110, and modules 114, 116. Further, as shown in computing device 100b, a control circuit 118 can be utilized to enable or disable the communication port 110. Moreover, the computing device 100b can include a security module 120 capable of detecting tampering with the register 112 and/or other unauthorized accesses.

A processor 130, such as a central processing unit (CPU) or a microprocessor suitable for retrieval and execution of instructions and/or electronic circuits can be configured to perform the functionality of any of the modules 114, 116 described below. In certain scenarios, instructions and/or other information, such as setting information, can be included in non-volatile memory 132 or other memories. Input/output interfaces 134 may additionally be provided by the computing device 100b. For example, input devices 140, such as a keyboard, a sensor, a touch interface, a mouse, a microphone, etc. can be utilized to receive input from an environment surrounding the computing device 100b. Further, an output device 142, such as a display, can be utilized to present information to users. Examples of output devices include speakers, display devices, amplifiers, etc. Moreover, in certain embodiments, some components can be utilized to implement functionality of other components described below.

A power supply can provide power to the computing device 100. When power is applied, a boot module 114 can be used to initialize the computing device 100 by starting a boot process. During the boot process, the boot module 114 initiate a setting module 116 to set the register 112 to enable or disable the communication port 110. This same process can be utilized to enable or disable other communication ports.

The setting module 116 may search a non-volatile memory 132, for example, a non-volatile random-access memory (NVRAM) for setting information associated with the communication port 110 and/or other communication ports. Additionally or alternatively, the setting module 116 may look at an address of the non-volatile memory 132 for the setting information. The setting information can be a simple indication of whether to enable or disable the communication port 110. Further, the setting information can be authentication protected. That is, for a user to have access to change the setting information, the user can be required to authenticate (e.g., via providing a password or personal identification via a password protection mechanism).

The setting module 116 retrieves the setting information from the non-volatile memory 132. This can be based on the search and/or based on addressing information available at the setting module 116. The register 112 is then set by the setting module 116 utilizing the setting information.

The register 112 can utilize a reset write-once mechanism. For example, when the register 112 is set, the register cannot be modified until the computing device 100 is reset. In certain embodiments, a system is reset when power is removed from the components of the computing device or a hardware reset signal is provided to the components of the computing device. As such, the register 112 can be attached to a power supply and be powered in such a manner that the register 112 is not cleared unless power is not supplied or a reset signal is applied. In certain scenarios, the reset signal is a system reset and not specific to a chip associated with the register 112. With this approach, the computing device 100 can go into a standby mode, a suspension mode, or other modes without changing the state of the register 112. As such, once the register 112 is set, the register 112 cannot be reset without a reboot of the computing device 100. The register 112 can be implemented using various types of circuitry and/or chips. For example, the register 112 can be implemented using a reset write-once GPIO chipset, a reset write-once GPIO super Input/Output chip, a reset write-once GPIO in another embedded controller, other reset write-once external circuits and/or application-specific integrated circuits (ASICs), or the like.

The register 112 can direct a control circuit 118 that is connected to one or more data lines of the communication port 110. If the register 112 is set to disable the communication port 110, the register 112 drives GPIO to cause the control circuit 118 to drive one or more of the data lines to a state. For example, the control circuit 118 can drive the data lines and/or a portion of the data lines to a representation of 1 or 0. When the register 112 is set to enable the communication port 110, the control circuit 118 can allow the data lines to function normally. The data lines can be between the communication controller (e.g., a USB controller) and the communication port 110.

Further, a security module 120 can detect an attempt to change the register 112. For example, the reset write-once chip associated with the register 112 can detect if a request to write to the register 112 has arrived after the register 112 has been set. In this scenario, the chip can provide this information to the security module 120. The security module 120 can then generate a notification and/or message that there was an attempt to change the set register 112. The computing device 100b can then be caused to transmit the notification about the attempt to another device. For example, the other device can be an administrator controlled terminal.

Additionally or alternatively the security module 120 or another security module can be used to determine unauthorized access to the non-volatile memory 132. For example, a basic input/output system (BIOS) can provide for administrator access by authentication. The authentication can include, for example, a user name and/or password, biometric input, or the like. If the authentication is unsuccessful, the security module 120 can generate a notification and transmit the notification, for example, via an electronic mail message. If the authentication is successful, the user can be provided access to the non-volatile memory 132, for example, via a menu interface. The menu can be presented on a display. Further, the menu can be used to change setting information. For example, a display including a list of communication ports and its setting information (e.g., enabled or disabled) can be presented. The setting information can be modified by the user. Then, upon the next system reboot, the updated setting information can be utilized to set the register 112.

In certain embodiments, the register 112 can be separated from a normal operation of a main CPU associated with the computing device 100. For example, the register 112 or the chip containing the register 112 may not be directly connected to the main CPU. Instead, the register 112 can be connected to a microprocessor that initiates the boot process and reads instructions and/or settings from the non-volatile memory 132 or another memory.

Each of the modules 114, 116, 120 may include, for example, hardware devices including electronic circuitry for implementing the functionality described below. In addition or as an alternative, each module may be implemented as a series of instructions encoded on a machine-readable storage medium of computing device 100 and executable by processor 130. It should be noted that, in some embodiments, some modules are implemented as hardware devices, while other modules are implemented as executable instructions.

In certain examples, the boot module 114 can execute in a recovery mode. In these examples, one or more communication ports 110 may be enabled to reload a new BIOS or other boot information. This failsafe is an additional advantage to disabling the ports instead of removing the ports entirely. In these examples, the circuitry enables the one or more communication ports 110 to be active until the register 112 is written to. As such, the default mode is to activate the ports. In the recovery mode, the boot instructions may be corrupted and not execute.

Figure 2:
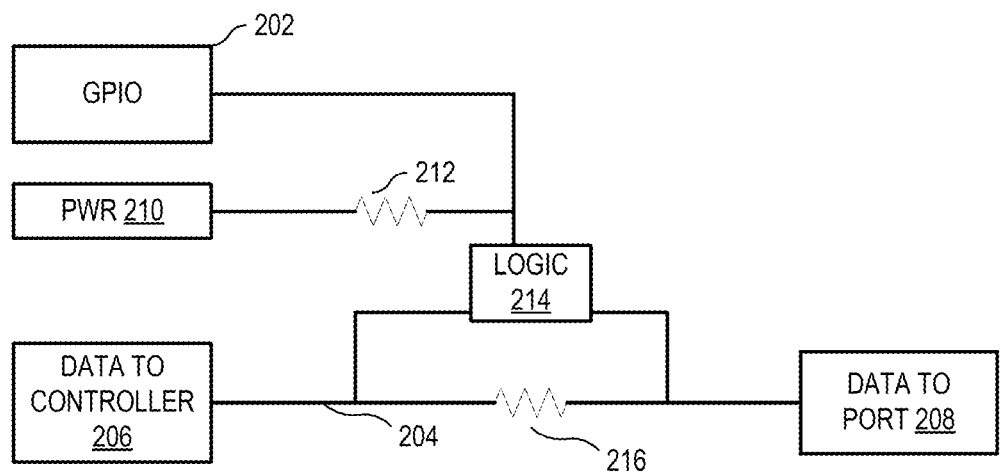
FIG. 2 is a diagram of a circuit capable of disabling a communication port, according to one example.

FIG. 2 is a diagram of a circuit capable of disabling a communication port, according to one example. The circuit 200 includes a GPIO 202 associated with a reset write-once register. The GPIO 202 can be utilized to control a data line 204. The data line 204 can be connected on a controller end 206 to a controller of a computing device. Further, the data line 204 can be connected on a port end 208 to a communication port.

In this example, a power supply 210 can be utilized to pull up a signal from the GPIO 202 using a resistor 212. In one scenario, when the associated port is to be enabled, the GPIO 202 can be set to float. Further, in certain examples, the default register setting can be set to float. As such, the ports can be utilized until a boot process writes to the register controlling the GPIO 202. When the associated port is set to be disabled, the GPIO 202 is set to ground or a low voltage. Other settings for the use of the GPIO 202 can be utilized. The control signal provided by the GPIO 202 is processed through logic 214 to drive the data line 204. In one example, the logic 214 can be one or more transistors and/or diodes, for example, the logic 214 can include a field-effect transistor (FET). When the control signal is set to disable, the data line to the port 208, the data line to the controller 206, or a combination thereof can be set to a particular state (e.g., to a logical 1 or a logical 0). The state can be driven by the logic 214. When the state is set to enable, the logic 214 can be set so that its connections to the data line to controller 206 and/or data line to port 208 to floating, allowing for data communication between the controller and the external device via the port to occur unimpeded.

A resistor 216 can be placed between the data line to controller 206 and the data line to port 208 to allow for different states on each side of the resistor. In certain examples, in a data line in which one end is designated as a transmission source and the other end is designated as a receiver, when disabled, the receiving end can be driven while the transmission end is left alone.

The circuit 200 shown is simplified for explanation purposes. It is contemplated that a single GPIO 202 can be used to drive multiple data lines associated with a communication port. Further, it is contemplated that a single GPIO 202 can be used to drive multiple data lines of multiple communication ports. For example, two USB ports may be enabled and/or disabled using a single register setting and GPIO 202.

In one example, the logic 214 can be N-type metal-oxide-semiconductor logic. For example, the logic 214 can be a metal-oxide-semiconductor field effect transistor (MOSFET). The GPIO 202 can be set to a logical 1 (e.g., represented by a value close to the power supply 210) or a logical 0 (e.g., a logic level set close to ground). In certain scenarios, when in a logical 1 mode, the GPIO 202 drives the signal, while in other scenarios the pin is set to be pulled up by the power supply 210. This control signal based on the GPIO 202 can be connected to a gate of the MOSFET. In this example, the source and drain of the MOSFET are connected to the data line to the controller 206 or the data line to the port 208. As such, when the GPIO 202 is set to a logical 0, the data line to the controller 206 and the data line to the port 208 are off, so that both states are set to a logical 0. Further, if the GPIO 202 is set to a logical 1, the drain and source are set to on, so that the data line to the controller 206 and the data line to the port 208 are the same.

Figure 3:
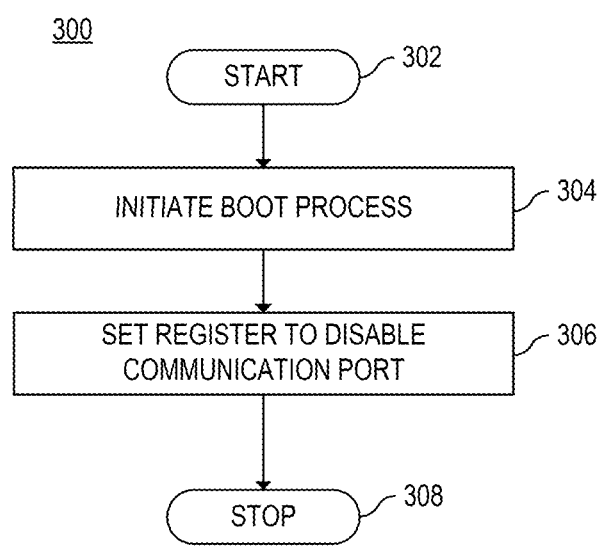
FIG. 3 is a flowchart of a method for disabling a communication port, according to one example.

FIG. 3 is a flowchart of a method for disabling a communication port, according to one example. Although execution of method 300 is described below with reference to computing device 100b, other suitable components for execution of method 300 can be utilized (e.g., computing device 100a, computing device 500, etc.). Method 300 may be implemented in the form of executable instructions stored on a machine-readable storage medium, and/or in the form of electronic circuitry.

Method 300 may start at 302 and move on to 304, where the computing device 100 initiates a boot process for the computing device 100. As previously noted, the computing device 100 includes a communication port 110. The communication port 110 can be external. The communication port 110 can be located in a manner in which an external component, for example, a USB drive, can be connected to the computing device 100 via an input/output interface 134. The boot process can be the initial code executed when the computing device is reset or turned on.

The boot process can cause a setting module 116 to retrieve setting information from non-volatile memory 132 to set a register 112 to enable and/or disable the communication port 110. At 306, the setting module 116 sets the register 112 to disable the external communication port. The register 112 is a reset write-once register. As such, once the register 112 is set, the register cannot be changed without resetting the computing device 100. Because the register cannot be changed without resetting the computing device 100, the register 112 is not reset when the computing device 100 is place in a suspended state. As such, a power supply that is on during the suspended state can be utilized to power register 112 or a chip associated with the register.

The register 112 can control a control signal that, when the register is set to disable, drives at least one data line associated with the external communication port to a state. The state can be, for example, a logical 1 or a logical 0. Further, the data line portion that is driven can be a portion of the data line that connects a transmitting end to a receiving end. In one example, the external communication port is a USB port. In this scenario, two data lines can be present. Each of these lines can be driven to a particular state based on the control signal. Because the lines are driven to the particular states, the USB port is effectively disabled and unusable.

In certain embodiments, the boot process is completed when the boot processes turns over control of the computing device 100 to another operating system. As such, the register 112 can be set prior to the loading of the operating system. Further, the register 112 can be set before the boot process provides a user with a communication interface. For example, the register 112 is set before the boot process allows a user to enter a BIOS configuration. The method 300 then stops at 308. The computing device 100 can then go on to perform other functions.

Figure 4:
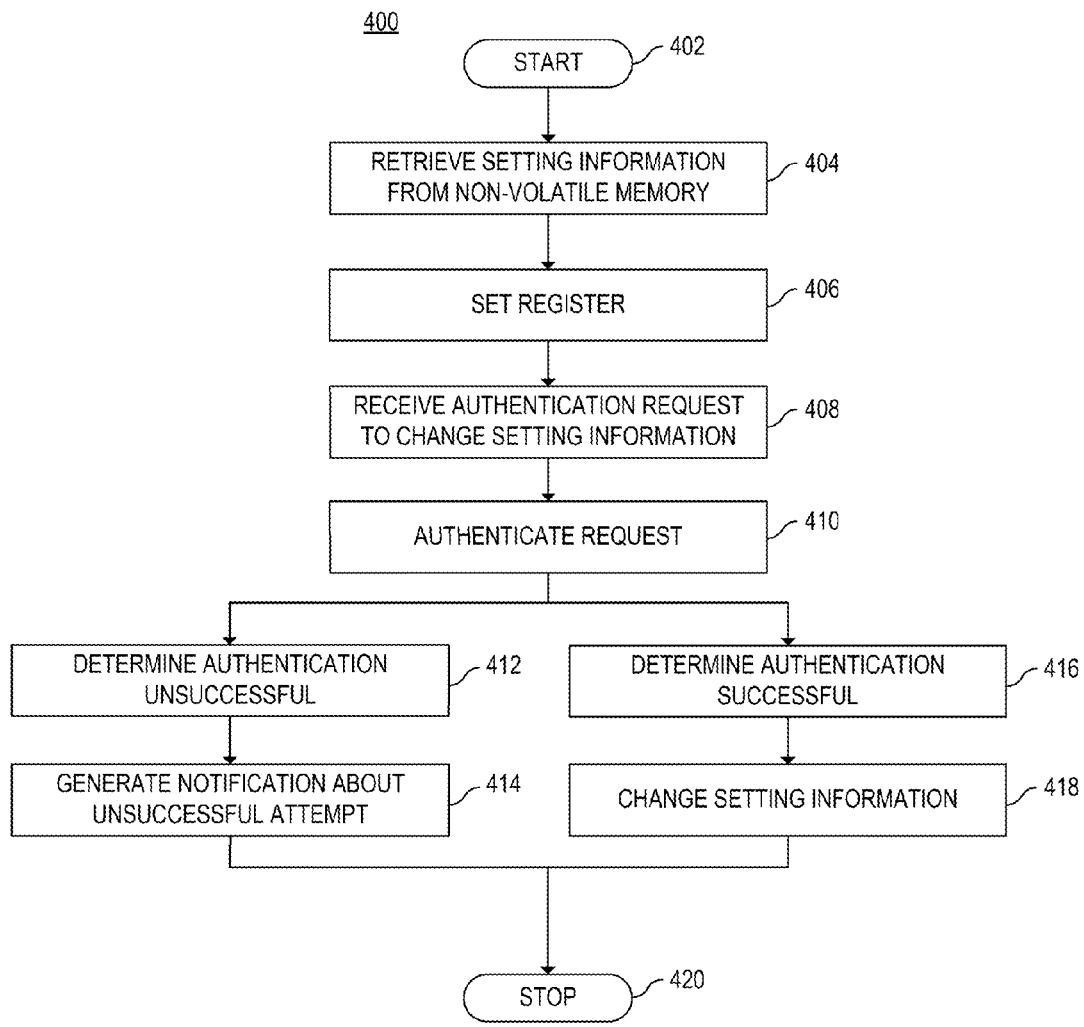
FIG. 4 is a flowchart of a method for determining when to disable a communication port, according to one example.

FIG. 4 is a flowchart of a method for determining when to disable a communication port, according to one example. Although execution of method 400 is described below with reference to computing device 100b, other suitable components for execution of method 400 can be utilized (e.g., computing device 100a, computing device 500, etc.). Method 400 may be implemented in the form of executable instructions stored on a machine-readable storage medium and/or in the form of electronic circuitry.

Method 400 may start in block 402. A boot process can be initiated and the setting module 116 can be utilized to determine whether to disable or enable one or more external communication ports. The setting module 116 retrieves setting information associated with one of the external communication ports from a non-volatile memory 132 at 404. The setting information can be utilized to determine whether a particular communication port should be enabled or disabled. For example, the setting information can include a list of ports and a Boolean value as to whether respective ports should be disabled or enabled.

At 406, the setting module 116 sets a register corresponding to the external communication port based on the setting information. The location of the register 112 can be stored in the setting information or be hardcoded in instructions executed by the setting module 116. Because the register 112 is a reset write-once register, once written, the value cannot be changed without a system reset.

The boot process can continue and provide an option for a user to configure the setting information (e.g., via a BIOS configuration menu). Because the register 112 is set prior to an accessibility of the setting information, changes to the register 112 take place after the next system reboot. For example, a user can cause a break in the normal boot process by providing an input to initiate a configuration menu. The configuration menu may be protected by an authentication mechanism. Example authentication mechanisms include a password mechanisms, biometrics, identification certificates, combinations thereof, etc.

At 408, the boot module 114 receives an authentication request to use the configuration menu and/or to change setting information. A menu for changing the setting information may include additional authentication from the normal configuration menu authentication. Then, at 410, the computing device 100 authenticates the request. The authentication can be successful or unsuccessful.

At 412, a security module 120 determines that the authentication was unsuccessful. This can be, for example, because an incorrect password or other credential was supplied. Then, at 414, the security module 120 generates a notification about the unsuccessful attempt. The notification can include information identifying the computing device, a timestamp, the type of attempt, combinations thereof, etc. In certain scenarios, the notification is not generated unless multiple unsuccessful attempts are used. The notification can be flagged as corresponding to the configuration menu, the setting information, etc. The notification is then transmitted to another device, for example, the device of an administrator.

At 416, the security module 120 determines that the authentication was successful. This can be, for example, because correct credentials were provided by the user. The user is presented an interface including an identifier of the external communication port and a value indicating whether the external communication port should be disabled or enabled. The user is provided the option to change the setting information at 418. Further, multiple ports can be controlled in such a manner. The method 400 then stops at 420. The next time the computing device 100 is reset, the computing device utilizes the new setting information to disable and/or enable the external communication ports.

Figure 5:
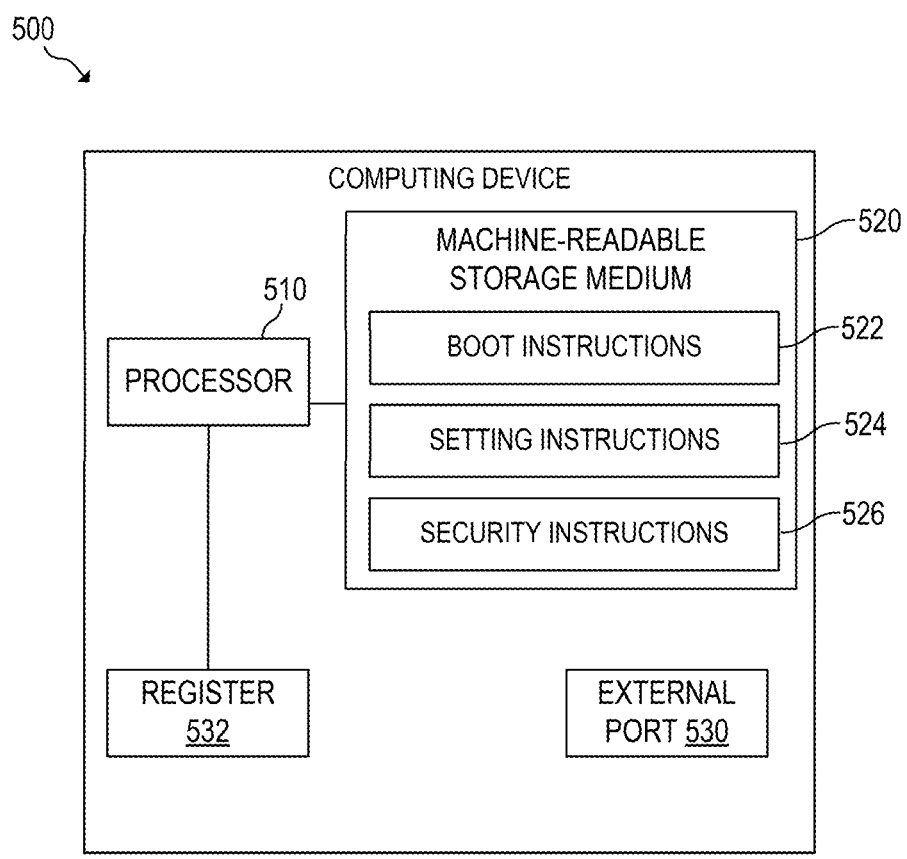
FIG. 5 is a block diagram of a computing device capable of controlling usability of an external port, according to one example.

FIG. 5 is a block diagram of a computing device capable of controlling usability of an external port, according to one example. The computing device 500 includes, for example, a processor 510, and a machine-readable storage medium 520 including instructions 522, 524, 526 for controlling the usability of an external port 530 of the computing device. Computing device 500 may be, for example, a notebook computer, a slate computing device, a portable reading device, a wireless email device, a workstation, a server, or any other computing device.

Processor 510 may be, at least one central processing unit, at least one semiconductor-based microprocessor, at least one graphics processing unit (GPU), other hardware devices suitable for retrieval and execution of instructions stored in machine-readable storage medium 520, or combinations thereof. For example, the processor 510 may include multiple cores on a chip, include multiple cores across multiple chips, multiple cores across multiple devices (e.g., if the computing device 100 includes multiple node devices), or combinations thereof. Processor 510 may fetch, decode, and execute instructions 522, 524, 526 to implement the methods 300, 400 of FIGS. 3 and 4. As an alternative or in addition to retrieving and executing instructions, processor 510 may include at least one integrated circuit (IC), other control logic, other electronic circuits, or combinations thereof that include a number of electronic components for performing the functionality of instructions 522, 524, 526.

Machine-readable storage medium 520 may be any electronic, magnetic, optical, or other physical storage device that contains or stores executable instructions. Thus, machine-readable storage medium may be, for example, Random Access Memory (RAM), an Electrically Erasable Programmable Read-Only Memory (EEPROM), a storage drive, a Compact Disc Read Only Memory (CD-ROM), and the like. As such, the machine-readable storage medium can be non-transitory. As described in detail below, machine-readable storage medium 520 may be encoded with a series of executable instructions for enabling or disabling one or more data lines of an external port 530 of the computing device.

The processor 510 can initialize the computing device 500 by executing boot instructions 522. The boot instructions 522 initiate a boot process for the computing device 500. The boot process may include a power on self test as well as other functionality to prepare the computing device 500 for use. During the boot process, setting instructions 524 can be called for execution on the processor 510.

The processor 510 executes the setting instructions 524 to set one or more registers 532 of the computing device 500. The registers control the functionality of one or more external ports. In this example, a single register 532 is used to control a single external port 530, however, one or more registers can be utilized to enable or disable one or more external ports.

During the boot process, the setting instructions 524 can set the register 532 to disable or enable one or more data lines of the external port 530. The register can be a reset write-once register. As such, the register 532 can be written to once after the computing device 500 is reset or initialized. Logic can prevent the register 532 from changing once it is set. Thus, a brute force attack on a chip associated with the register 532 to re-enable it once disabled is rendered useless.

The register 532 can be set based on register settings. The processor 510 receives the register settings from a non-volatile memory associated with a BIOS of the computing device 500. The register is set based on the register settings. For example, the register settings can include information designating whether to set the register to enable or disable the external port 530.

The register 532 controls circuitry, such as a switch, to enable or disable the external port 530. For example, if the register 532 is set to disable, the one or more data lines of the external port 530 are driven to a state. Once driven, the state lasts until the computing device 500 is reset or shut down because the register 532 is remains unchanged until a reset or shutdown. Driving the one or more data lines to the state effectively disables the external port 530 because the data line cannot be used to send or receive meaningful communication.

Once the register 532 is set, other functions of the computing device 500 can be performed. In one example, the boot instructions 522 can turn over control of the processor 510 to an operating system. In another example, a configuration menu associated with the BIOS can be presented. The configuration menu can be protected by an authentication scheme (e.g., a username and password) as detailed in method 400. This configuration menu may be used to modify the non-volatile memory, for example, the register settings in the non-volatile memory.

Further, security instructions 526 can be executed by the processor 510 to determine if a user attempts to modify the register 532 once the register 532 is set. A chip or chipset associated with the register 532 receives the request and can determine that the register 532 has already been written to. The chipset can detect the attempted modification and communicate this information to the processor 510. The chipset and/or the processor 510 then generate and transmit a message describing the attempt to another device. The message can include an identifier of the computing device 500, a description of what happened (e.g., an identification of the register 532 and what was attempted to be modified), an identifier of the seriousness of the attempt, or a combination thereof.

With the above approaches, a computing device is capable of securely disabling communication ports. The disabling can occur at the BIOS level and occur before an operating system is provided control of the computing device. As such, the operating system and users of the operating system do not have access to the disabled ports. This can be useful to keep unwanted information (e.g., a virus, copyright infringing downloads, etc.) from coming into the computing device or network associated with the computing device. Further, this can be useful to keep protected information (e.g., private information, secret information, etc.) from being taken or leaked. Moreover, with this approach, a single computing device footprint can be used to meet the needs of multiple customers with different port disabling needs because each of the unwanted ports need not be physically removed. In one example, some customers may wish to have all of the ports enabled, while other customers may wish to have a designated portion of the ports disabled. Additionally, the availability of the ports can be useful to perform maintenance and upgrades to the system or system components, such as BIOS.

What is claimed is:

1. A method comprising:
   initiating a boot process for a computing device including an external communication port;
   setting a register to disable the external communication port during the boot process,
   wherein once the register is set, the register cannot be changed without resetting the computing device; and
   retrieving setting information associated with the external communication port from a non-volatile memory,
   wherein the setting of the register is based on the setting information, the setting information can be accessed during the boot process, and the setting information is protected by an authentication mechanism.

2. The method of claim 1,
   wherein the register controls a control signal that, when the register is set to disable, drives at least one data line associated with the external communication port to a state.

3. The method of claim 1, further comprising: detecting an unsuccessful authentication attempt; generating a notification about the attempt; and transmitting the notification.

4. The method of claim 1, wherein the register is set prior to an accessibility of the setting information.

5. The method of claim 1, wherein the register is not reset when the computing device is placed in a suspended state.

6. The method of claim 1,
   wherein the external communication port is a universal serial bus port, and
   wherein the register is set prior to the loading of an operating system.

7. The method of claim 1, wherein resetting the device includes removing system power from the computing device.

8. The method of claim 1, wherein resetting the device includes removing power from the register.

9. A computing device comprising:
   a communication port;
   a register;
   a boot module to start a boot process of the computing device, a setting module to set the register during the boot process to either enable or disable the communication port,
   wherein once the register is set, the register cannot be reset without a reboot of the computing device; and
   a non-volatile memory,
   wherein the setting module retrieves setting information from the non-volatile memory, the register is set based on the setting information, and the setting information is password protected.

10. The computing device of claim 9, further comprising:
    a security module,
    wherein the security module is caused to determine an attempt to change the set register, and
    wherein the computing device is caused to transmit a notification about the attempt.

11. The computing device of claim 9, further comprising:
    a circuit connected to one or more data lines of the communication port,
    wherein if the register is set to disable the communication port, the register drives a general purpose input output to cause the circuit to drive the one or more data lines to a state.

12. The device of claim 9, wherein the register is part of a reset write-once chipset.

13. A non-transitory machine-readable storage medium storing instructions that, if executed by at least one processor of a device, cause the at least one processor to:
    initiate a boot process for the device;
    set a reset write-once register, during the boot process, to disable or enable one or more data lines of an external port of the device,
    wherein if the register is set to disable the one or more data lines, the register controls a switch to drive the one or more data lines to a state; and
    retrieve, during the boot process, register settings from a non-volatile memory associated with a basic input output system of the device,
    wherein the reset write-once register is set based on the register settings, and modifications to the non-volatile memory are protected by an authentication scheme.

14. The non-transitory machine-readable storage medium of claim 13, further comprising instructions that, if executed by the at least one processor, cause the at least one processor to:
    detect an attempt to modify the reset write-once register; and
    transmit a message describing the attempt to another device.

15. The non-transitory machine-readable storage medium of claim 13, further comprising instructions that, if executed by the at least one processor, cause the at least one processor to:
    load boot information during a recovery mode operation;
    wherein the one or more data lines remain active until the register is written to.

* * * * *